United States Patent
Rogers et al.

(10) Patent No.: US 11,324,337 B2
(45) Date of Patent: May 10, 2022

(54) BED FILLING SYSTEM

(71) Applicant: Worldwise, Inc., Novato, CA (US)

(72) Inventors: Tracy Rogers, Mission, TX (US); Jacob Dominguez, Mercedes, TX (US); Andrew Murrer, Alamo, CA (US)

( * ) Notice: Subject to any disclaimer, the term of this patent is extended or adjusted under 35 U.S.C. 154(b) by 1535 days.

(21) Appl. No.: 15/239,393

(22) Filed: Aug. 17, 2016

(65) Prior Publication Data
US 2018/0049560 A1    Feb. 22, 2018

(51) Int. Cl.
*A47C 27/12* (2006.01)
*A01K 1/035* (2006.01)

(52) U.S. Cl.
CPC .......... *A47C 27/122* (2013.01); *A01K 1/0353* (2013.01)

(58) Field of Classification Search
CPC .......... A01K 1/353; Y10T 442/60; B68G 7/06
See application file for complete search history.

(56) References Cited

U.S. PATENT DOCUMENTS

| | | | | |
|---|---|---|---|---|
| 2,060,629 A * | 11/1936 | Mcjoynt | ................ | B68G 7/06 141/10 |
| 2,211,360 A * | 8/1940 | Adams | ................ | B68G 7/06 100/215 |
| 2,646,913 A * | 7/1953 | Goldberg | ................ | B68G 7/06 100/151 |
| 3,188,264 A * | 6/1965 | Holden | ................ | B29C 44/56 206/584 |
| 3,426,372 A * | 2/1969 | Enelow | ................ | A47G 9/10 5/490 |
| 3,574,658 A * | 4/1971 | Fulk et al. | ................ | F16C 33/10 427/242 |
| 3,900,648 A * | 8/1975 | Smith | ................ | A47C 27/22 5/636 |
| 3,922,756 A * | 12/1975 | Ogasawara | ................ | D01G 1/04 19/148 |
| 4,027,064 A * | 5/1977 | Bussey, Jr. | ................ | B65D 81/09 206/523 |
| 4,127,220 A * | 11/1978 | Werthaiser | ................ | G01G 13/24 141/83 |
| 4,664,160 A * | 5/1987 | Rothstein | ................ | D01G 23/08 141/67 |
| 5,103,879 A * | 4/1992 | Hickerson | ................ | D01G 99/00 141/114 |
| 5,169,580 A * | 12/1992 | Marcus | ................ | A47G 9/00 264/115 |
| 5,199,244 A * | 4/1993 | Beier | ................ | B68G 7/06 141/67 |
| 5,571,465 A * | 11/1996 | Gill | ................ | B29C 43/006 264/121 |
| 6,033,501 A * | 3/2000 | Yamaguchi | ................ | B29C 43/006 156/62.2 |
| 6,083,586 A * | 7/2000 | Andersen | ................ | B29C 43/22 428/36.4 |
| 6,235,391 B1 * | 5/2001 | Contreras | ................ | D01F 6/70 428/367 |

(Continued)

*Primary Examiner* — Eric J Kurilla

(57) ABSTRACT

A method and device for carrying out the method of converting waste such as thermally bonded polyester fiber to bed cushioning. Such waste is fed to a fiber lofter which forms lofted fiber. The lofted fiber is pneumatically transferring to a hopper, and from the hopper to an injector, the injector having a lofted fiber input nozzle and output nozzle, the output nozzle being a low friction tube.

2 Claims, 2 Drawing Sheets

(56) References Cited

U.S. PATENT DOCUMENTS

| | | | | |
|---|---|---|---|---|
| 6,588,462 B1* | 7/2003 | Ogawa | ............ | B29C 31/041 |
| | | | | 141/65 |
| 6,860,092 B2* | 3/2005 | Collida | ............ | A63H 9/00 |
| | | | | 53/521 |
| 9,410,026 B1* | 8/2016 | Rees | ............ | C08K 9/08 |
| 9,724,852 B1* | 8/2017 | Rees | ............ | B29C 43/003 |
| 2001/0023510 A1* | 9/2001 | Masubuchi | ............ | B29C 44/427 |
| | | | | 5/636 |
| 2005/0166330 A1* | 8/2005 | Williams | ............ | A47C 27/12 |
| | | | | 5/740 |
| 2007/0261170 A1* | 11/2007 | Hollander | ............ | A44B 19/301 |
| | | | | 5/636 |
| 2009/0148698 A1* | 6/2009 | Kawaguchi | ............ | B29C 44/586 |
| | | | | 428/338 |
| 2011/0293911 A1* | 12/2011 | Coates | ............ | B32B 5/26 |
| | | | | 428/220 |
| 2012/0245257 A1* | 9/2012 | Fascio | ............ | B29B 9/12 |
| | | | | 524/35 |
| 2013/0047926 A1* | 2/2013 | Simon | ............ | A01K 1/0353 |
| | | | | 119/28.5 |
| 2013/0196154 A1* | 8/2013 | Ortlepp | ............ | B29B 9/04 |
| | | | | 428/357 |
| 2013/0291801 A1* | 11/2013 | Throndsen | ............ | A01K 29/00 |
| | | | | 119/28.5 |
| 2014/0261190 A1* | 9/2014 | Landers | ............ | A01K 1/0353 |
| | | | | 119/28.5 |
| 2019/0112179 A1* | 4/2019 | Alletto | ............ | B68G 7/06 |

\* cited by examiner

BED FILLING SYSTEM

TECHNICAL FIELD

The present invention is directed to a method of converting waste fiber to bed cushioning, a device for carrying out the method, as well as a bed containing such cushioning. Through the use of the present invention, waste such as thermally bonded polyester fiber can be employed as cushioning resulting in a product far superior to competitive bedding while creating a high-value product from what would otherwise be recycled waste.

BACKGROUND OF THE INVENTION

It is quite common to produce mattresses, furniture, automotive seating and the like from spunbond or thermally bonded waste such as polyester fiber. Such product can either be siliconized or non-siliconized and is shredded and recycled in the making of similar products. This is carried out by subjecting the waste to a conventional lofter and the fibers bonded in a traditional fashion.

Although, theoretically, the lofted waste fibers would be ideally suited as cushioning for beds and cushions, creating acceptable products has been unachievable to date. Prior attempts have employed rotary positive displacement fans or paddles to move the waste fibers to the appropriate bedding but, in doing so, the fibers lose their loft and as a consequence, the sought after cushioning characteristics of the fill material has proven to be simply unacceptable.

It has now been determined that if the appropriate injector could be fabricated which could not only move lofted fibers from a suitable source to the interior of a bedding product while maintaining its bedding could be created which is far superior to that previously thought possible.

It is thus an object of the present invention to convert waste fibers to bed cushioning having characteristics not previously attainable.

This and further objects be more readily apparent when considering the following disclosure and appended claims.

SUMMARY OF THE INVENTION

A method of converting waste such as thermally bonded polyester fiber to bed cushioning, said method comprising feeding the waste to a fiber lofter and lofting it therein to form lofted fiber, pneumatically transferring said lofted fiber to a hopper, and transferring said lofted fiber from said hopper to an injector, said injector comprising a lofted fiber input nozzle and output nozzle, said output nozzle comprising a low friction tube.

A bed for supporting a human or animal comprising an outer shell fabric defining its interior volume, said bed comprising waste such as thermally bonded polyester fiber which has been lofted and introduced to said interior volume by pneumatically passing said lofted fiber through an injector, said injector having an input end for receiving said lofted fiber and an output end comprising a low friction tube.

An injector for transferring lofted fibers, said injector comprising an inlet for receiving lofted fibers, an outlet for expelling lofted fibers, said outlet comprising a low friction tube, said injector having a longitudinal axis and substantially circular cross-section, said injector being devoid of any obstruction along its longitudinal axis and at least an annular compressed gas array for conveying compressed gas within said injector located along said longitudinal axis upstream of said low friction tube.

DETAILED DESCRIPTION OF THE INVENTION

Figure 1:
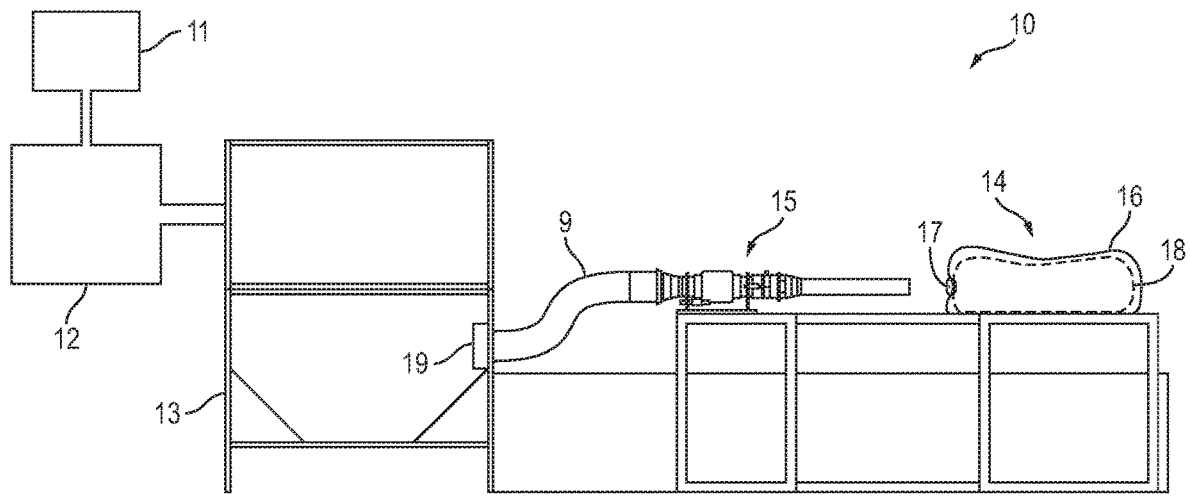
FIG. 1 is a side plan view of a typical flow diagram used to carry out the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As previously mentioned, there have been prior attempts to create bed cushioning from recycled waste for to do so would represent an advance as to waste disposal and as an inexpensive source of such cushioning. An ideal source of such waste is thermally bonded polyester fiber which has been used in a wide variety of products such as automotive seating, mattresses and furniture. Traditionally, such waste has been lofted but not used to fill bedding, as bedding products using fibrous waste have proven to be by and large unacceptable. This is because lofted fibers have traditionally been introduced to the interior of bedding or cushioning employing paddles or rotary positive displacement fans resulting in a significant loss of fiber loft. This cushioning, as a consequence, is far inferior to other products in providing the characteristics sought after by humans and animals seeking a comfortable and supportive bedding product. The present invention overcomes these shortcomings by providing a simplistic yet inventive method and apparatus for carrying it out without resort to fans or paddles resulting in a bedding product which is competitive with bedding made using virgin materials.

To more fully appreciate the present invention, reference is first made to FIG. 1.

System 10 is composed of waste source 11, ideally, that of thermally bonded polyester fiber. This waste is fed to lofter 12 such as the Model FF-60 sold by Carded Clothing Services. The lofted fiber is pneumatically conveyed to hopper or aerated plenum 13 serving as a feed source for the filling process. Suction is then employed to propel the fibers to pet bed 14 which is composed of outer shell 16 and, as a preferred embodiment, liner 18 contained therein. Suitable waste fibers are introduced to the interior of outer shell fabric 16 or inner liner 18 through opening 17 acting as a target for the output of injector 15.

Figure 2:
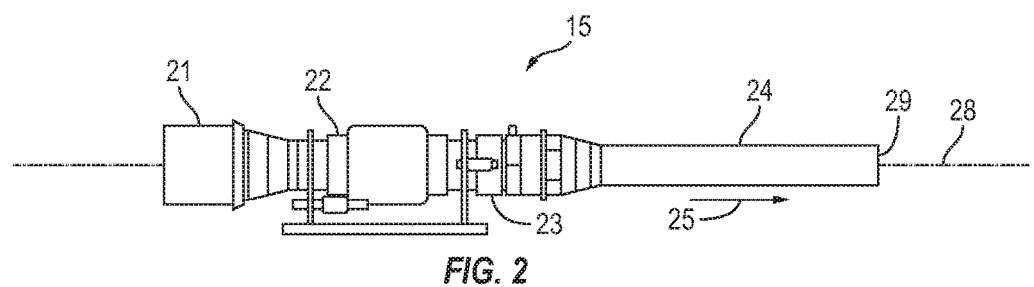
FIG. 2 is a side view of an injector used to carry out the invention illustrated in FIG. 1.
Figure 3:
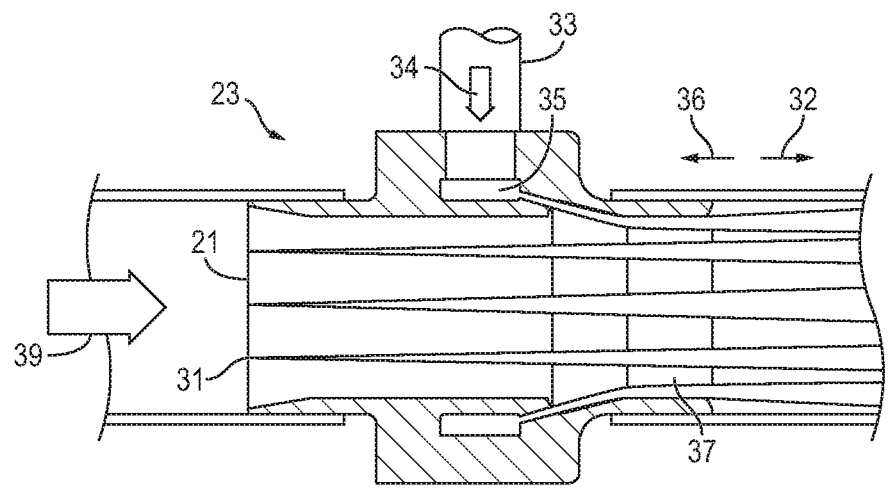
FIG. 3 is a perspective view of a capillary vent array used in carrying out the present method.

The details pertaining to injector 15 can best be appreciated in reference to FIGS. 2 and 3. Injector 15 comprises inlet 21 for receiving lofted fibers from aerated plenum or hopper 13. The injector is further characterized as comprising low friction tube 24 on its outlet end. The low friction tube can be composed of any number of dry lubricants such as polyethylene terephthalate and polytetrafluoroethylene. An ideal material for fabricating low friction tube 24 is Dicronite® which is a tungsten disulfide sold by Lubrication Sciences, Inc. of San Jose, Calif.

Injector 15 is also characterized as having longitudinal axis 28 and substantially circular cross-section 29 noting that injector 15 is devoid of any obstruction along longitudinal axis 28. Unlike the prior art that uses in-line fans or paddles, injector 15 is provided with at least one annular compressed gas array 23, illustrated in FIG. 2 as including two such annular compressed gas arrays 22 and 23. Annular compressed gas injector 23 is composed of inlet 33 from which compressed gas, such as compressed air, is injected in the direction of arrow 34 and into plenum chamber 35. The compressed gas is then injected into throat 37 of injector 15 through directed nozzles or jets 31. These nozzles or jets of compressed gas create a vacuum at inlet 21 which draws lofted fibers into injector 15 (in the direction of arrow 39 and toward low friction tube 24 in the direction of arrow 32). Throat 37 together with directed nozzles or jets 31 are capable of conveying lofted fibers over long vertical or horizontal distances. Through the use of annular compressed gas array 23, there is no obstruction along the longitudinal axis 28 and, a consequence, lofted fibers maintain their sought after loft creating an ideal cushioning material for bed or cushion 14. It should further be noted that the annular compressed gas array employing nozzles or jets 31 can also be positioned upstream of injector 15 shown as element 19 at the outlet of hopper or plenum 13. It should also be noted that once bed or cushion 14 is filled, its volume can be compressed for shipment and storage by providing a vacuum created by injector 15. This can be accomplished by reversing annular compressed gas array 23 by moving compressed gas in the direction of arrows 36 and toward injector inlet 21.

There are a number of benefits that stem from the adoption and use of the present invention. Injector 15 operates without any moving parts utilizing the benefits attributable to an interior smoothbore thus reducing jams and blockages. Injector 15 is suitable for use with a wide variety of materials including foam fiber and additives. It reduces energy consumption compared to electric motor driven fan type blowers using recirculating air for moving lofted fibers as disclosed. Hoses 9 and low friction tube 24 can be made to be ionizing eliminating static shock to operators and facilitating removal of fibers that would otherwise cling to finished goods. By eliminating large blowers, noise levels inherent in carrying out a bed filling process can be made to operate within OSHA standards while reducing heat inherent in the operation of electric motors. Injector 15 can be provided with quickchange couplings to allow for faster changeovers and customized nozzle sizing and configurations. Nozzles with low friction coefficients reduce sticking, increases flow rates particularly for non-siliconized fill materials. This system is insensitive to fiber lengths while maintaining fiber loft due to reduction of impact from conventional fan veins and paddles.

Figure 4:
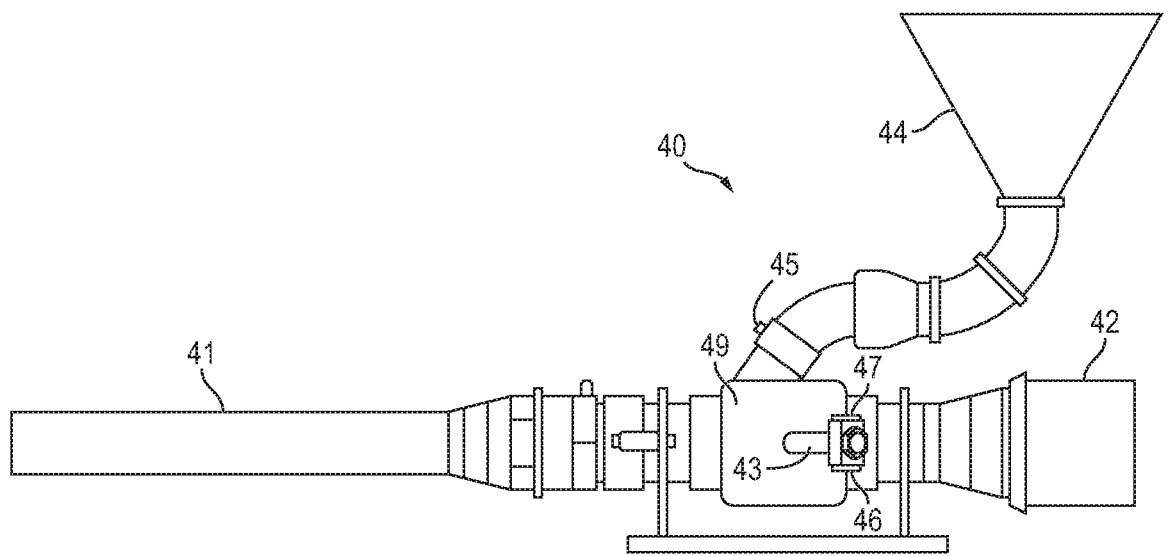
FIG. 4 is a side view of a second embodiment of an injector used to carry out the invention illustrated in FIG. 1 and for the introduction of liquid and solid additives during the fill procedure.

In turning to FIG. 4, injector 40 is depicted for illustrating yet a further embodiment of the present invention. As was the case with injector 15, injector 40 is provided with low friction tube 41 and substantially circular inlet 42 and is devoid of any obstruction along its longitudinal axis which would interfere with the conveying of lofted fiber during the bed fill process. The embodiment of FIG. 4 illustrates how custom nozzles can be incorporated within the present invention allowing for metered dosing of additives when desirable to create specific properties.

As the embodiment of FIG. 4 illustrates, quick change cam lock coupling 49 can be incorporated within nozzle 40 enabling an operator to inject atomized liquid through atomizer 43. Liquid is fed through opening 46 and pressurized gas through opening 47 causing the liquid to atomize as it is introduced within injector 40 upstream of low friction tube 41. The atomizer mixes liquids with pressurized gas such as pressurized air to create a fine mist. The gas is generally powered by a compressed air feed via a capillary tube from an actuated valve, such as a foot pedal that controls airflow to the entire filling system. The level of liquid in the mist is regulated by air pressure applied to the atomizer. The mist under pressure is pulled into the venture-driven flow of the fill material and into a suitable receptacle, such as a bed.

Solid additives can be introduced by placing them within hopper 44 and fed to the interior of injector 40 at quick change cam lock coupling 49 through the introduction of pressurized gas through opening 45. For dry materials introduced to hopper 44, a smaller air conveyor can be employed than that which drives the movement of lofted fibers and atomized liquids through the injector. Venturi holes can also be employed similar to the directed nozzles or jets 31 (FIG. 3) to expel those solid additives introduced to hopper 44 into the lofted fibers passing through injector 40.

The liquid and solid additives bypass plenum chamber 35 to avoid cleaning the plenum chamber when changing over to other additives when desired as many of the additives are highly concentrated essential oils and other materials. These additives are generally quite expensive and doses are quite small. Such additives are employed to create certain properties in the bed such as flea and tick resistance, stress reduction or simply altering the aroma of the fill among other things.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A method of converting waste to bed cushioning, said method comprising: feeding said waste to a fiber lofter and lofting said waste therein to form lofted fiber; pneumatically transferring said lofted fiber to a hopper; and transferring said lofted fiber from said hopper to an injector, said injector comprising a lofted fiber input nozzle and output nozzle, said output nozzle comprising a low friction tube; wherein said low friction tube comprises polyethylene terephthalate.

2. A method of converting waste to bed cushioning, said method comprising: feeding said waste to a fiber lofter and lofting said waste therein to form lofted fiber; pneumatically transferring said lofted fiber to a hopper; and transferring said lofted fiber from said hopper to an injector, said injector comprising a lofted fiber input nozzle and output nozzle, said output nozzle comprising a low friction tube; wherein said low friction tube comprises polytetrafluoroethylene.

\* \* \* \* \*